April 19, 1932.  A. ANDREWS  1,854,607
ENGINE COOLING AND SUPERCHARGING MEANS
Filed May 15, 1930  2 Sheets-Sheet 1
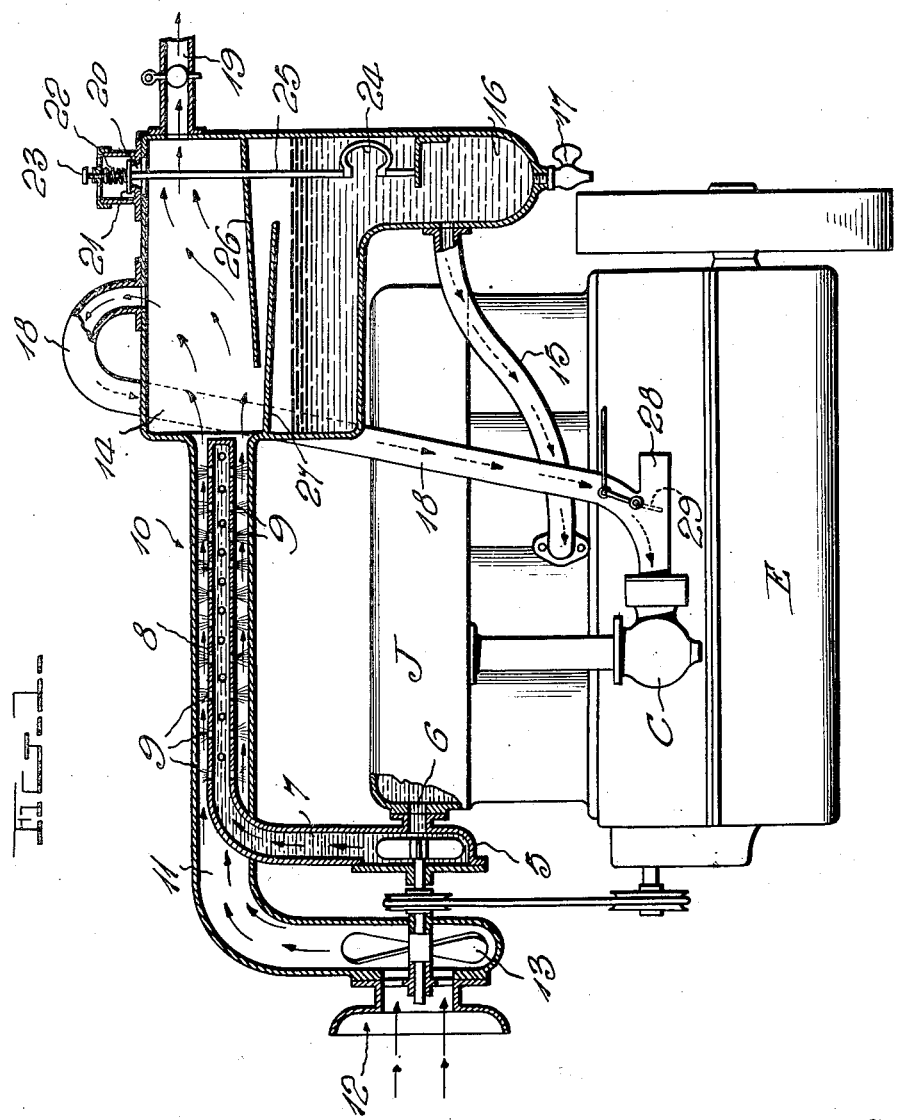
Witness
H. Woodard
Inventor
Albert Andrews
By H. B. Wilson
Attorneys April 19, 1932. A. ANDREWS 1,854,607
ENGINE COOLING AND SUPERCHARGING MEANS
Filed May 15, 1930 2 Sheets-Sheet 2
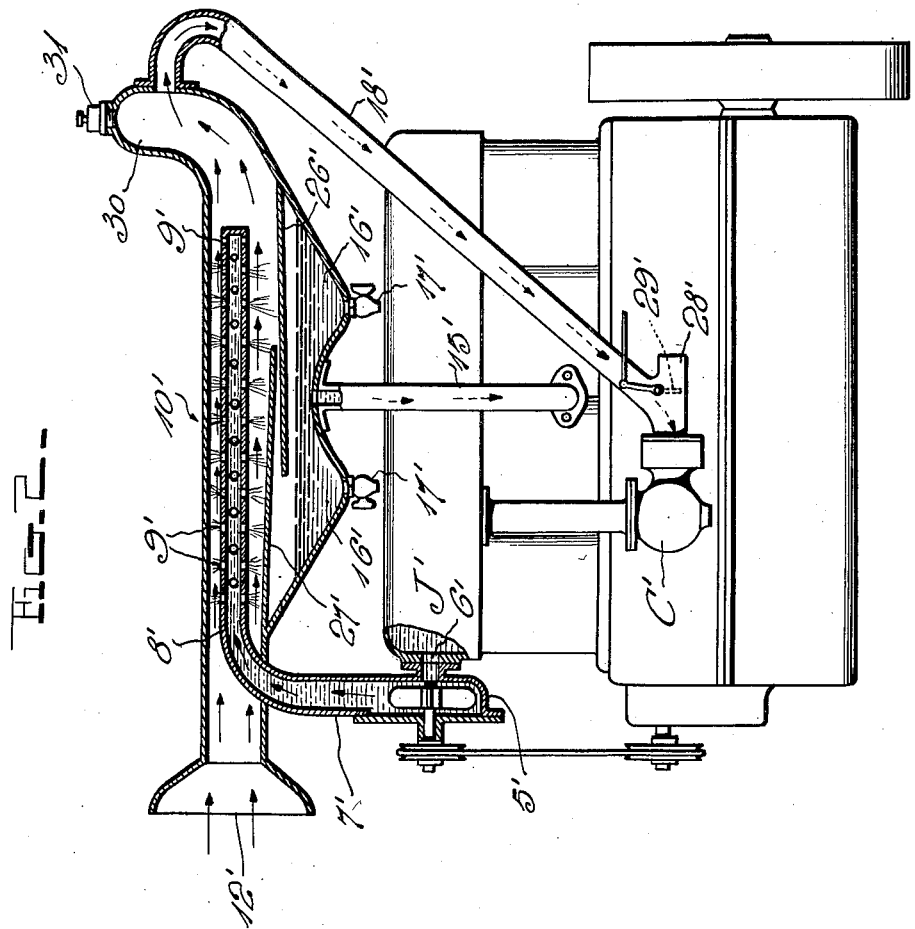
Witness
H. Woodard
Inventor
Albert Andrews
By H. B. Wilson & Co.
Attorneys Patented Apr. 19, 1932

1,854,607

UNITED STATES PATENT OFFICE

ALBERT ANDREWS, OF DEADWOOD, SOUTH DAKOTA

ENGINE-COOLING AND SUPERCHARGING MEANS

Application filed May 15, 1930. Serial No. 452,726.

The invention relates to new and improved means for cooling the water of a water jacketed internal combustion engine by passing a blast of air through a jacket portion of a casing into which the hot water from the engine jacket is sprayed, and said invention relates also to super-charging means for the engine cylinders, in that a passage leads uninterruptedly to the carbureter air inlet from a chamber portion of said casing into which no water is sprayed, thereby conducting warm damp air under pressure to the carbureter. Hence, an engine equipped with the invention is well adapted for use at high altitudes, for instance, in the field of aviation, it being insured that a proper charge of air and fuel shall be supplied to the engine cylinders even though the air through which the machine is flying, may be unusually rare.

One object of the invention is to provide for more efficient cooling of the water than has heretofore been possible without the use of the conventional radiator.

Another aim is to make exceptionally simple provision whereby the invention acts also as a super-charger.

Another object is to provide an auxiliary air outlet from the aforesaid chamber portion of the casing together with a controlling valve for said auxiliary outlet, whereby upon opening of said valve, more rapid travel of air may take place through the casing to attain greater cooling efficiency.

Yet another aim is the provision of a thermostatically-controlled valve for controlling the travel of air through the casing, in accordance with the temperature of the cooled water.

The air-conducting casing embodies a sump in which the cooled water collects to some extent and from which said water returns to the engine jacket, and a further object is to provide novel means for trapping the water in this sump, even though the engine be tilted forwardly or rearwardly, this being of particular advantage in connection with aircraft.

With the foregoing and minor objects in view, the invention resides in the novel subject matter hereinafter described and claimed, description being accomplished by reference to the accompanying drawings.

Figs. 1 and 2 are side elevations partly in section showing two different forms of the invention.

In Fig. 1, E denotes a conventional internal combustion engine having a water jacket J and carburetor C. A pump 5 driven in any suitable way, is provided to draw water through the outlet 6 of the jacket J. Leading from this pump is a water conducting pipe 7 through which said pump discharges the water drawn from the jacket J. This pipe is provided with a straight portion 8 having a multiplicity of discharge perforations 9 spaced apart both longitudinally and circumferentially of said straight pipe portion, so that a myriad of water jets will be sprayed from the perforations when the motor is in operation. An air-conducting casing 10 is provided, said casing embodying a pipe-like jacket portion 11 co-axial with and spaced around the pipe portion 8. At its front end, the jacket portion 11 of the casing 10 is provided with an air inlet 12, and a fan 13 is provided to force air through the jacket and the jets of water sprayed from the pipe portion 8, for the purpose of cooling the water. The casing 10 also embodies a chamber 14 into which no water is sprayed, and a sump 16 in which the cooled water collects and from which said cooled water returns to the engine jacket J, through a pipe 15. A low part of the sump 16 is provided with a drain cock or the like 17 for drawing off any sediment which may collect therein. Extending uninterruptedly from the chamber 14 to the air inlet of the carburetor C is an air-conducting pipe 18 which communicates with said chamber 14 above the liquid level. The air under pressure blown through the jacket 11 by the fan 13, travels through the sprayed water from the perforations 9 thereby cooling the water and incidentally collecting some moisture therefrom. Moreover, this moistened air is of course heated. The moist heated air is forced through the pipe 18 into the carburetor C so that the effect of a supercharger is obtained, as well as increasing the efficiency of the engine by supplying damp warm air thereto.

If desired, some of the heated air from the chamber 14 may be conducted through a valved pipe 19 for heating the cabin, cock-pit or the like of an airship upon which the engine is used, or for heating a closed automobile body.

At 20, I have shown an auxiliary air outlet from the chamber 14. For this outlet, a valve 21 is provided, said valve being normally held closed by a spring 22 whose strength may be varied by an adjusting screw 23. A thermostat 24 is mounted in the sump 16 and is connected with the valve 21 by a rod or the like 25. Should the temperature of the water in the sump 16 rise above a predetermined degree, the thermostat 24 expands, thereby raising the rod 25 and opening the valve 21. As soon as this takes place, some of the hot air can escape through the outlet 20. Hence, there is less resistance to rearward travel of air through the casing 10, with the result that the air will move more rapidly, thereby attaining greater cooling efficiency. As soon as the water has been cooled to a predetermined extent, the thermostat 24 again contracts and the valve 21 closes.

In order to trap the water in the sump 16 should the engine tilt forwardly or rearwardly, two horizontal baffles 26 and 27 are provided in the casing 10 between the chamber 14 and the sump 16, above the water level of the latter. These baffles are co-extensive in width with the chamber 14, baffle 26 extends forwardly from the rear wall of said chamber and baffle 27 extends rearwardly from the front wall of the chamber. Should the engine tilt forwardly, the water is trapped by the baffle 27, and baffle 26 performs a similar function if the engine tilts rearwardly. These baffles are hence of advantage in ascending or descending grades when the engine is used in a motor vehicle, or when ascending and descending, if the engine be employed on an aircraft.

In addition to the air inlet pipe 18, the carburetor C is preferably provided with a fresh air inlet 28. Travel of air through this inlet however may be prevented by a valve 29 when the carburetor is to receive its air supply from the pipe 18. Similarly by moving valve 29 to another position, it prevents travel of air through the pipe 18 and opens the fresh air inlet 28. Whenever conditions are such that the engine may be more advantageously operated without super-charging, valve 29 is positioned to close pipe 18 and open the fresh air inlet 28.

In the form of construction shown in Fig. 2, the reference characters 5′, 6′, 7′, 8′, 9′, 10′, 12′, 16′, 17′, 18′, 28′, 29′, J′ and C′, denote features of construction corresponding to the similarly identified features in Fig. 1. The air inlet 12′ of the jacket portion of the casing 10′ however, is provided with no fan, the velocity of the vehicle or craft upon which the engine is mounted, being relied upon to create the necessary forcible travel of air through said casing. Collection of water takes place in the lower part of the casing 10′ instead of in the rear end thereof, and there are two low sump portions 16′ between which is a water return pipe 15′, two drain cocks or the like 17′, being provided for said sump portions 16′. The air-conducting pipe 18′ leads from an upwardly turned rear chamber portion 30 of the casing 10′, into which no water is sprayed, said portion being preferably provided with a relief valve 31 adapted to automatically open should the pressure in the casing 10′ rise above a predetermined extent. Baffles 26′ and 27′ between the jacket and sump portions of the casing 10′, trap the water in said sump portion should the engine tilt forwardly or rearwardly.

By providing the pipe 8 or 8′ with the water discharge openings 9 or 9′ spaced apart longitudinally of said pipe and also spaced circumferentially of the latter, and by having this pipe surrounded by a pipe-like jacket portion of the casing 10 or 10′, it is insured first that a myriad of small jets of the hot water shall be directed across the space through which the incoming air must travel, and second that this incoming air shall come in contact with all of these jets. Consequently, effective cooling of the water is obtained and moreover the air becomes warmed and dampened, so that when it is forced to the carbureter, combustion is aided and fuel consumption decreased. Moreover, by forcing this air through the carburetor through an uninterrupter passage leading from the air-conducting casing 10 or 10′, the effect of a super-charger is obtained, without the expense and complication which super-chargers now entail.

While either form of construction will operate efficiently, it is to be understood that both of the disclosures herein given are illustrative, and that within the scope of the invention as claimed, numerous variations may be made. For instance, although both casings 10 and 10′ and associated parts are shown in close proximity to the engine, they could well be located at any desired distance from the latter, it being only necessary to increase the length of the pipes and passages leading from said engine to the actual cooling unit.

I claim:—

1. A water cooling means for a water-jacketed internal combustion engine, comprising a water-conducting passage leading from the outlet of the engine jacket and provided with water spraying means, an air-conducting casing embodying a jacket portion around said water spraying means, a water sump, and a chamber portion into which no water is sprayed, said jacket portion having an inlet for air under pressure to cool the sprayed water, an air-conducting passage leading uninterruptedly to the engine carbureter from said chamber portion of said casing to supply warm damp air under pressure to said carbureter, and a cooled water return passage from said sump to the engine jacket.

2. A structure as specified in claim 1; together with a fresh air inlet for the carbureter and valve means for opening the latter and closing said air-conducting passage if required.

3. A structure as specified in claim 1; together with an auxiliary air outlet from said chamber portion of said casing, and a valve for controlling said auxiliary air outlet, opening of said valve allowing some of the hot air to escape from said chamber portion.

4. A structure as specified in claim 1; together with an auxiliary air outlet from said chamber portion, a valve for controlling said auxiliary air outlet, and thermostatic means operable upon predetermined rise in temperature of the cooled water for opening said valve, thereby allowing some of the hot air to escape from said chamber portion.

5. A water cooling means for a water-jacketed internal combustion engine comprising a water-conducting passage leading from the outlet of the engine jacket and provided with water-spraying means, an air-conducting casing embodying a jacket portion around said water spraying means, a water sump and a chamber portion into which no water is sprayed, said jacket portion having an inlet for air under pressure to cool the sprayed water, a cooled water return passage from said water sump to the engine jacket, and a thermostatically-controlled air outlet valve for said chamber portion, said valve being adapted when opened to allow hot air to readily escape from said chamber portion.

6. A water cooling means for a water-jacketed internal combustion engine comprising a water-conducting passage leading from the outlet of the engine jacket and provided with water-spraying means, an air-conducting casing embodying a jacket portion around said water-spraying means and a water sump, said jacket portion having an inlet for air under pressure to cool the sprayed water, a water return passage from said sump to the engine jacket, and baffle means for trapping the water in said sump upon tilting of the engine.

7. A water cooling means for a water-jacketed engine, comprising a pump for forcing water from the outlet of the engine jacket, a water pipe through which the water is forced by said pump, said pipe having a multiplicity of water spraying outlets spaced apart longitudinally and circumferentially thereof, an air conducting casing embodying a pipe portion surrounding and extending longitudinally of the portion of said water pipe provided with said water spraying outlets, a chamber portion into which no water is sprayed, and a water sump, one end of said casing having an inlet for air under pressure, said chamber portion being at the other end of the casing and being provided with an air outlet, whereby the air traveling through said casing will cool the water sprayed from said water pipe, and a cool water conducting passage leading from said sump to the engine jacket.

In testimony whereof I affix my signature.

ALBERT ANDREWS.